(12) United States Patent
Mori et al.

(10) Patent No.: US 8,271,110 B2
(45) Date of Patent: Sep. 18, 2012

(54) SOUND SOURCE SUPPLY APPARATUS AND SOUND SOURCE SUPPLY METHOD

(75) Inventors: Hisayuki Mori, Tokyo (JP); Boo An Kim, Seoul (KR)

(73) Assignees: NEC Corporation, Tokyo (JP); Oniontech, Seoul (KR)

( * ) Notice: Subject to any disclaimer, the term of this patent is extended or adjusted under 35 U.S.C. 154(b) by 1432 days.

(21) Appl. No.: 11/884,530

(22) PCT Filed: Feb. 28, 2006

(86) PCT No.: PCT/JP2006/304224
§ 371 (c)(1),
(2), (4) Date: Aug. 17, 2007

(87) PCT Pub. No.: WO2006/090934
PCT Pub. Date: Aug. 31, 2006

(65) Prior Publication Data
US 2008/0267424 A1    Oct. 30, 2008

(30) Foreign Application Priority Data
Feb. 28, 2005    (JP) .................................. 2005-054290

(51) Int. Cl.
*G06F 17/00* (2006.01)
*H04H 40/00* (2008.01)
(52) U.S. Cl. ........................................ 700/94; 455/3.06
(58) Field of Classification Search ................... 700/94; 455/3.06
See application file for complete search history.

(56) References Cited

U.S. PATENT DOCUMENTS 5,519,166 A    5/1996    Furuhashi et al.
(Continued)

FOREIGN PATENT DOCUMENTS

EP    1073039 A2    1/2001
(Continued)

OTHER PUBLICATIONS

ETSI EN 300 730, Digital Cellular Telecommunications System (Phase 2+); Voice Activity Detector (VAD) for Enhanced Full Rate (EFR) Speech Traffic Channels, Global Systems for Mobile Communications, GSM 06.82 version 8.0.1, 2000, pp. 1-19.

(Continued)

*Primary Examiner* — Davetta W Goins
*Assistant Examiner* — Daniel Sellers
(74) *Attorney, Agent, or Firm* — Foley & Lardner LLP

(57) ABSTRACT

The present invention provides a sound source supply apparatus capable of playing music with less degradation of sound by processing an original sound source such that music is not determined to be a noise.

According to the present invention, it is possible to obtain a sound source supply apparatus (20) for providing a service for playing music via a portable terminal (105), the sound source supply apparatus having a sound source file storage device (200) for preliminarily storing a plurality of types of processed sound source files (202 and 203) produced by processing an original sound source of the music so as to reduce degradation of sound according to a plurality of types of codec characteristics and a sound source playback device (300) for determining a codec type (106) of the portable terminal (105) from a start signal indicative of a playback request when the sound source playback device receives the start signal, playing back one processed sound source file corresponding to the determined codec type selectively from the plurality of types of processed sound source files (202 and 203), and supplying the one processed sound source file to the portable terminal (105) so as to play the music via the portable terminal.

6 Claims, 5 Drawing Sheets

U.S. PATENT DOCUMENTS

| | | | |
|---|---|---|---|
| 5,696,500 A | 12/1997 | Diem | |
| 6,654,718 B1 | 11/2003 | Maeda et al. | |
| 6,738,805 B2 | 5/2004 | Negishi | |
| 6,959,220 B1* | 10/2005 | Wiser et al. | 700/94 |
| 7,567,846 B2* | 7/2009 | Sztybel | 700/94 |
| 2002/0181721 A1 | 12/2002 | Sugiyama et al. | |
| 2003/0016807 A1 | 1/2003 | Otsuka | |
| 2003/0172384 A1 | 9/2003 | Comps et al. | |
| 2005/0250554 A1* | 11/2005 | Chen et al. | 455/570 |

FOREIGN PATENT DOCUMENTS

| | | |
|---|---|---|
| JP | 02-036628 | 2/1990 |
| JP | 3-123269 | 5/1991 |
| JP | 3-191645 | 8/1991 |
| JP | 07-191695 | 7/1995 |
| JP | 9-162978 | 6/1997 |
| JP | 10-92054 A | 4/1998 |
| JP | 2001-245020 A | 9/2001 |
| JP | 2002-51164 A | 2/2002 |
| JP | 2002-247156 A | 8/2002 |
| JP | 2003-37683 A | 2/2003 |
| JP | 2003-505937 A | 2/2003 |
| JP | 2003-177748 A | 6/2003 |
| JP | 2004-78021 A | 3/2004 |
| KR | 2001-0007416 | 1/2001 |
| KR | 2004-0047444 | 5/2004 |
| RU | 2154357 C2 | 8/2000 |
| RU | 2231227 | 6/2004 |
| TW | 1223536 | 11/2004 |
| TW | 1226556 | 1/2005 |
| WO | WO 01/06735 A2 | 1/2001 |
| WO | WO 01/09878 A1 | 2/2001 |
| WO | WO 2004/036551 A1 | 4/2004 |
| WO | WO 2004/079936 A1 | 9/2004 |

OTHER PUBLICATIONS

DTM Magazine, vol. 12, No. 1, whole No. 128, Jan. 1, 2005, pp. 14-15.

English Translation of Office Action issued for Russian Application No. 2007135871, Filing Date: Feb. 28, 2006, 4 pages.

* cited by examiner

SOUND SOURCE SUPPLY APPARATUS AND SOUND SOURCE SUPPLY METHOD

TECHNICAL FIELD

The present invention relates to a sound source supply apparatus and a sound source supply method for storing, as a sound source file, music to be played via a portable terminal, playing back and supplying the sound source file to the portable terminal so as to play the music via the portable terminal.

BACKGROUND ART

Japanese laid-open patent publication No. 3-123269 (Reference 1) discloses a telephone exchange system which stores a voice of a ring-back tone or a busy tone in a telephone exchange and responds to a calling telephone with the voice.

Japanese laid-open patent publication No. 3-191645 (Reference 2) discloses a telephone capable of detecting a ring-back tone or a busy tone and outputting the detection result with a voice.

Japanese laid-open patent publication No. 9-162978 (Reference 3) discloses that images/voice messages to be sent from a subscriber to callers are preliminarily registered in a switchboard, and that the images/voice messages are sent to a caller before or during ringing when the subscriber receives calling.

Published Japanese translation No. 2003-505937 (Reference 4) discloses a technique to send commercial information in the form of voice/text/image instead of a ring-back tone.

However, none of References 1 to 4 pays attention to playing music via a portable terminal having a codec.

FIG. 1 shows a system having a conventional sound source supply apparatus 10. The system shown in FIG. 1 has the conventional sound source supply apparatus 10, a gateway switch (GS) 102, a mobile switching center (MSC) 103, a base station 104, and a cellular phone 105 as a portable terminal. Specifically, the cellular phone 105 is a GSM (Global System for Mobile Communication) terminal and has an audio codec 106 called an RPE-LTP (Regular Pulse Excited-Long Term Prediction) codec. The gateway switch 102 and the mobile switching center 103 form a switched network.

The conventional sound source supply apparatus 10 has a sound source file storage device 100 for storing a sound source file (later referred to as an original sound source file) 201 in a 128-kbit/sec WAV format (Windows® standard sound file format, also called WAVE) and a sound source playback device (dial melody device) 101.

The sound source file 201 is sent as a μ-Law PCM (Pulse Code Modulation) signal or an A-Law PCM signal of 64 kbit/sec by the sound source playback device 101. The gateway switch 102 and the mobile switching center 103 directly transmit the sound source file at 64 kbit/sec. Accordingly, no degradation of sound is caused to the sound source file in the gateway switch 102 and the mobile switching center 103.

The signal is converted into a wireless area signal with the same audio codec (RPE-LTP codec) 107 as the audio codec 106 of the cellular phone 105 by the base station 104. In a case where a user only listens to music, the audio codec 107 of the base station 104 converts the PCM signal into a GSM encode signal, and the audio codec 106 of the cellular phone 105 converts the GSM encode signal into the PCM signal. The cellular phone 105 converts the PCM signal into an analog signal and plays the music with a speaker for an owner of the cellular phone or the like. In a case where the user speaks, the cellular phone 105 performs a conversion opposite to the conversion for listening to music. In this case, the cellular phone 105 converts a voice from a microphone into a PCM signal, and the audio codec 106 of the cellular phone 105 converts the PCM signal into a GSM encode signal. The audio codec 107 of the base station 104 converts the GSM encode signal into the PCM signal.

Because a band between the base station 104 and the cellular phone 105 is narrow, an encode process specialized in human voice is performed. Accordingly, some frames in music are not regarded as a voice but as a noise. Thus, since noise frames are transmitted instead of the music, the quality of sound is degraded.

In other words, the codec 106 specialized in voice is used in the conventional sound source playback because of a narrow transmission band between the base station 104 and the cellular phone 105. Accordingly, there is a problem that the sound quality of music cannot be maintained.

This problem in the conventional sound source playback will be described in greater detail.

In response to a playback request of music, a prepared sound source file 201 is connected to the cellular phone network (including the gateway switch 102, the mobile switching center 103, and the base station 104) in an audio mode (64 Kbit/s, PCM) and played. In the cellular phone 105, particularly in a narrow-band cellular phone, degradation of sound is caused by codec characteristics of the wireless area. Accordingly, there is a problem that music cannot be provided with high quality.

The audio codec 106 used in the cellular phone 105 is designed to transmit only human voices even in a narrow band. Thus, the audio codec 106 employs an encode method specialized in human voice. On the other hand, music is considered to partially include white noise. Thus, since music is different from human voice, a waveform of music is suppressed so as to degrade the quality of sound.

DISCLOSURE OF INVENTION

Problems to be Solved by the Invention

Causes of sound degradation are as follows. Although causes and states of degradation differ depending upon types of codecs, causes of degradation in GSM will be described below by way of example.

In the GSM, if a signal is determined not to be a voice by a VAD (Voice Activity Detection), then the frame is transferred as an SID (Silent Description) frame. The original purpose for this is to supply a noise of the SID frame to a silent interval after a voice, for example, "Hello," to thereby prevent surrounding sounds, e.g., automobile sounds. If music is determined not to be a voice by the VAD, then the frame is transferred as the SID frame. Accordingly, a large noise is outputted because of the SID frame. Although three types of codecs including Full rate, Half rate, and Enhanced full rate have different encode methods, the logic of the VAD is similarly applicable to those three types.

The present invention is to change an operation of the VAD for preventing degradation of sound because the operation of the VAD is a primary cause of the sound degradation.

Specifically, it is an object of the present invention to provide a sound source supply apparatus and a sound source supply method capable of playing music with less degradation of sound by analyzing determination logic between sound and noise in a used codec and processing an original sound source such that music is not determined to be a noise.

Means for Solving the Problems

A sound source supply apparatus according to the present invention and a sound source supply method according to the present invention are as follows.

(1) A sound source supply apparatus for providing a service for playing music via a portable terminal, characterized by comprising:

a sound source file storage device for preliminarily storing a plurality of types of processed sound source files produced by processing an original sound source of the music so as to reduce degradation of sound according to a plurality of types of codec characteristics; and a sound source playback device for determining a codec type of the portable terminal from a start signal indicative of a playback request when the sound source playback device receives the start signal, playing back one processed sound source file corresponding to the determined codec type selectively from the plurality of types of processed sound source files, and supplying the one processed sound source file to the portable terminal so as to play the music via the portable terminal.

(2) The sound source supply apparatus as recited in Item (1), characterized in that:

the sound source playback device determines the codec type of the portable terminal based on caller information included in the start signal when it receives the start signal indicative of a playback request.

(3) The sound source supply apparatus as recited in Item (1), characterized in that:

any of the plurality of types of processed sound source files is produced by processing the original sound source so as to silence at least one frame that is regarded as a noise if the original sound source is not processed, out of audio frames in the original sound source.

(4) The sound source supply apparatus as recited in Item (3), characterized in that:

any of the plurality of types of processed sound source files is produced by processing the original sound source so as to silence a plurality of successive frames beginning from the frame that is regarded as a noise if the original sound source is not processed, out of the audio frames in the original sound source.

(5) The sound source supply apparatus as recited in Item (4), characterized in that:

any of the plurality of types of processed sound source files is produced by processing the original sound source so as to silence three successive frames beginning from the frame that is regarded as a noise if the original sound source is not processed, out of the audio frames in the original sound source.

(6) A sound source supply method of providing a service for playing music via a portable terminal, characterized by comprising:

a step of preliminarily storing a plurality of types of processed sound source files produced by processing an original sound source of the music so as to reduce degradation of sound according to a plurality of types of codec characteristics;

a type determination step of determining a codec type of the portable terminal from a start signal indicative of a playback request on receipt of the start signal; and a step of playing back one processed sound source file corresponding to the determined codec type selectively from the plurality of types of processed sound source files and supplying the one processed sound source file to the portable terminal so as to play the music via the portable terminal.

(7) The sound source supply method as recited in Item (6), characterized in that:

the type determination step comprises determining the codec type of the portable terminal based on caller information included in the start signal on receipt of the start signal indicative of a playback request.

(8) The sound source supply method as recited in Item (6), characterized in that:

any of the plurality of types of processed sound source files is produced by processing the original sound source so as to silence at least one frame that is regarded as a noise if the original sound source is not processed, out of audio frames in the original sound source.

(9) The sound source supply method as recited in Item (8), characterized in that:

any of the plurality of types of processed sound source files is produced by processing the original sound source so as to silence a plurality of successive frames beginning from the frame that is regarded as a noise if the original sound source is not processed, out of the audio frames in the original sound source.

(10) The sound source supply method as recited in Item (9), characterized in that:

any of the plurality of types of processed sound source files is produced by processing the original sound source so as to silence three successive frames beginning from the frame that is regarded as a noise if the original sound source is not processed, out of the audio frames in the original sound source.

(11) A sound source supply apparatus for providing a service for playing music via a portable terminal, characterized by comprising:

a sound source file storage device for preliminarily storing a processed sound source file produced by processing an original sound source of the music so as to reduce degradation of sound according to codec characteristics of the portable terminal; and a sound source playback device for playing back the processed sound source file when the sound source playback device receives a start signal indicative of a playback request and supplying the processed sound source file to the portable terminal so as to play the music via the portable terminal, wherein the processed sound source file is produced by processing the original sound source so as to silence at least one frame that is regarded as a noise if the original sound source is not processed, out of audio frames in the original sound source.

(12) The sound source supply apparatus as recited in Item (11), characterized in that:

the processed sound source file is produced by processing the original sound source so as to silence a plurality of successive frames beginning from the frame that is regarded as a noise if the original sound source is not processed, out of the audio frames in the original sound source.

(13) The sound source supply apparatus as recited in Item (12), characterized in that:

the processed sound source file is produced by processing the original sound source so as to silence three successive frames beginning from the frame that is regarded as a noise if the original sound source is not processed, out of the audio frames in the original sound source.

(14) A sound source supply method of providing a service for playing music via a portable terminal, characterized by comprising:

a step of preliminarily storing a processed sound source file produced by processing an original sound source of the music so as to reduce degradation of sound according to codec characteristics of the portable terminal; and a step of playing back the processed sound source file on receipt of a start signal indicative of a playback request and supplying the processed sound source file to the portable terminal so as to play the music via the portable terminal, wherein the processed sound source file is produced by processing the original sound source so as to silence at least one frame that is regarded as a noise if the original sound source is not processed, out of audio frames in the original sound source.

(15) The sound source supply method as recited in Item (14), characterized in that:

the processed sound source file is produced by processing the original sound source so as to silence at least one frame that is regarded as a noise if the original sound source is not processed, out of the audio frames in the original sound source.

(16) The sound source supply method as recited in Item (15), characterized in that:

the processed sound source file is produced by processing the original sound source so as to silence a plurality of successive frames beginning from the frame that is regarded as a noise if the original sound source is not processed, out of the audio frames in the original sound source.

(17) The sound source supply method as recited in Item (16), characterized in that:

the processed sound source file is produced by processing the original sound source so as to silence three successive frames beginning from the frame that is regarded as a noise if the original sound source is not processed, out of the audio frames in the original sound source.

Effects of the Invention

According to the present invention, since a sound source file processed so as to correspond to a codec of a portable terminal to be supplied with music is connected to the portable terminal, music can be played with less degradation of sound.

DESCRIPTION OF THE REFERENCE NUMERALS AND SIGNS

Figure 1:
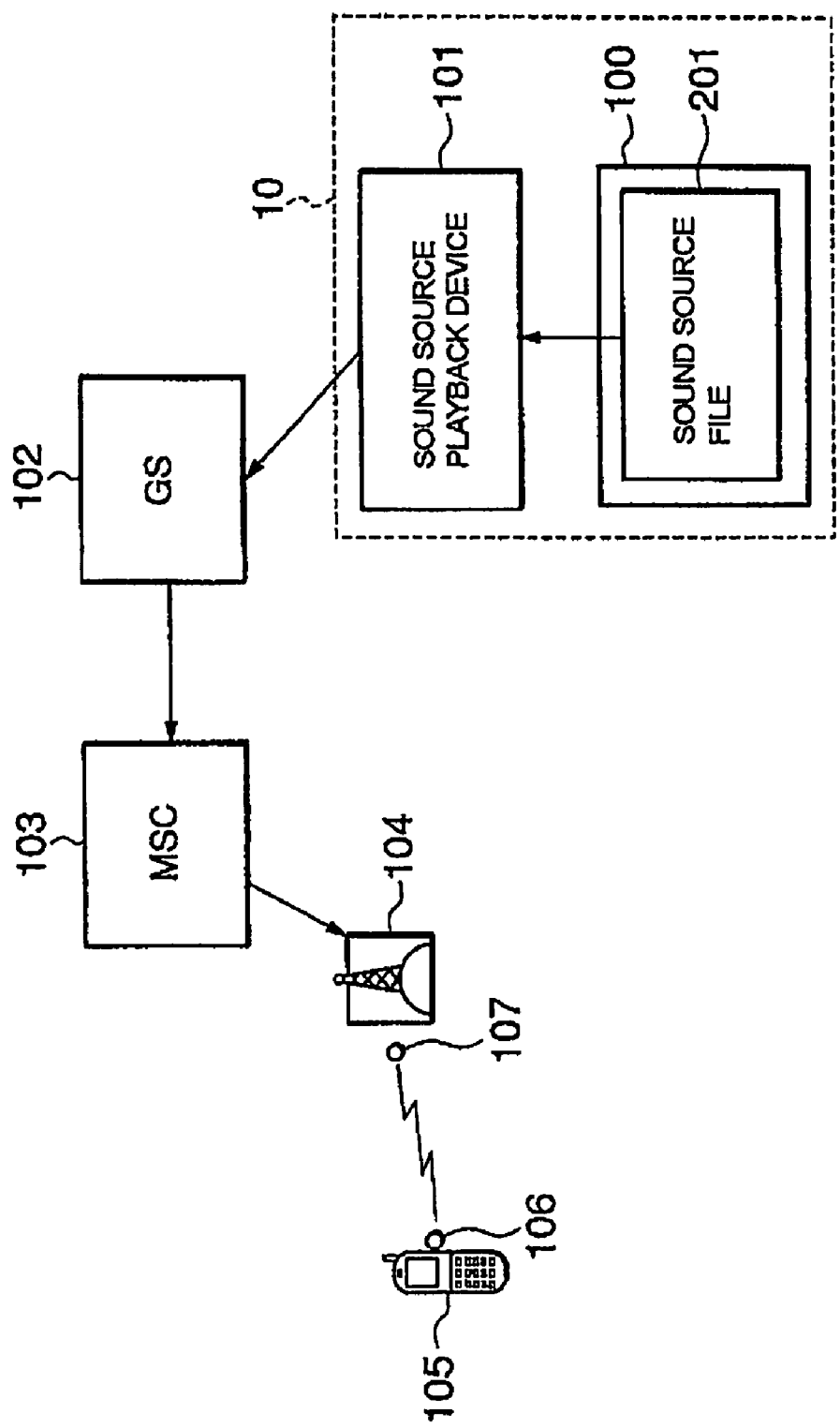
FIG. 1 is a diagram explanatory of a system having a conventional sound source supply apparatus.

10 Sound source supply apparatus
100 Sound source file storage device
101 Sound source playback device
102 Gateway switch (GS)
103 Mobile switching center (MSC)
104 Base station
105 Cellular phone
106 Audio codec
107 Audio codec
20 Sound source supply apparatus
200 Sound source file storage device
201 Sound source file or original sound source file
202 Processed sound source file (for GSM)
203 Processed sound source file (for cdma)
300 Sound source playback device

BEST MODE FOR CARRYING OUT THE INVENTION

As described below, the present invention has the following features. A sound source is processed so as to reduce degradation of sound according to codec (COder-DECoder) characteristics of a portable terminal in a service for listening to music via the portable terminal. A plurality of types of processed sound source files are preliminarily produced and stored. By selecting and playing an optimal sound source file corresponding to the codec type in response to a playback request, it is possible to play music with the highest quality of sound.

In a sound source supply apparatus according to the present invention, a sound source playback device determines a codec type of a portable terminal based on a calling network type IAM (Initial Address Message) included in a start signal and selects an optimal sound source processed so as to correspond to the codec type.

Thus, according to the present invention, a dedicated sound source file having less degradation of sound is selected and played according to a codec. Therefore, it is possible to play music with less degradation of sound according to the codec of the portable terminal.

Here, the core of the present invention will be described. According to the present invention, the sound source file is processed so as to reduce degradation of sound even in use of a narrow-band cellular phone network. This processing technique is the core of the present invention.

The state of sound degradation depends upon an encode algorithm of a codec type used in a cellular phone network. Accordingly, a processing method of the sound source file should be changed for each codec. Sound degradation of music can be prevented by determining a cellular phone network of a caller, selecting and connecting a sound source file processed for the codec used in that cellular phone network.

Primary cellular phone networks, codec types, and transmission bands are listed below in Table 1.

TABLE 1

Codec and transmission band for each system

| System | Codec | Transmission band | Audio band (Kbit/sec) |
|---|---|---|---|
| PHS | ADPCM | 32 | 32 |
| PDC Full rate | VSELP | 11.2 | 6.7 |
| PDC Half rate | PSI-CELP | 5.6 | 3.45 |
| GSM Full rate | PRE-LTP | 22.8 | 13 |
| GSM Full rate | VSELP | 11.5 | 5.6 |
| GSM EFR | A-CELP | 13 | 7.4 |
| CdmaOne | EVRC | 9.6 | 8 |

TABLE 1-continued

Codec and transmission band for each system

| System | Codec | Transmission band | Audio band (Kbit/sec) |
|---|---|---|---|
| Fixed telephone (for reference) | PCM | 64 | 64 |

Note: The transmission band is a band for all signals (Kbit/sec), and the audio band is a band in which sound signals are transmitted (Kbit/sec).

Here, PHS stands for Personal Handyphone System, ADPCM Adaptive Differential Pulse Code Modulation, PDC Personal Digital Cellular, VSELP Vector Sum Excited Linear Prediction, PSI-CELP Pitch Synchronous Innovation-Code Excited Linear Prediction, RPE-LTP Regular Pulse Excited-Long Term Prediction, EFR Enhanced Full Rate, A-CELP Algebraic-Code Excited Linear Prediction, Cdma Code division multiple access, and EVRC Enhanced Variable Rate Codec.

In the following embodiment of the present invention, a case where a subscriber of a GSM network listens to music via a "dial melody service" will be described. Here, the "dial melody service" is a service for playing music specified by B instead of a ring-back tone for A while A is calling B (Ring Back Melody service).

In the GSM network, there are three types of codecs including Full rate, Half rate, and EFR (Enhanced Full Rate). Different codecs are used depending upon carriers. Accordingly, different countermeasures (different sound source processing methods) are taken to cope with different carriers. Some carriers use a plurality of codecs.

Figure 2:
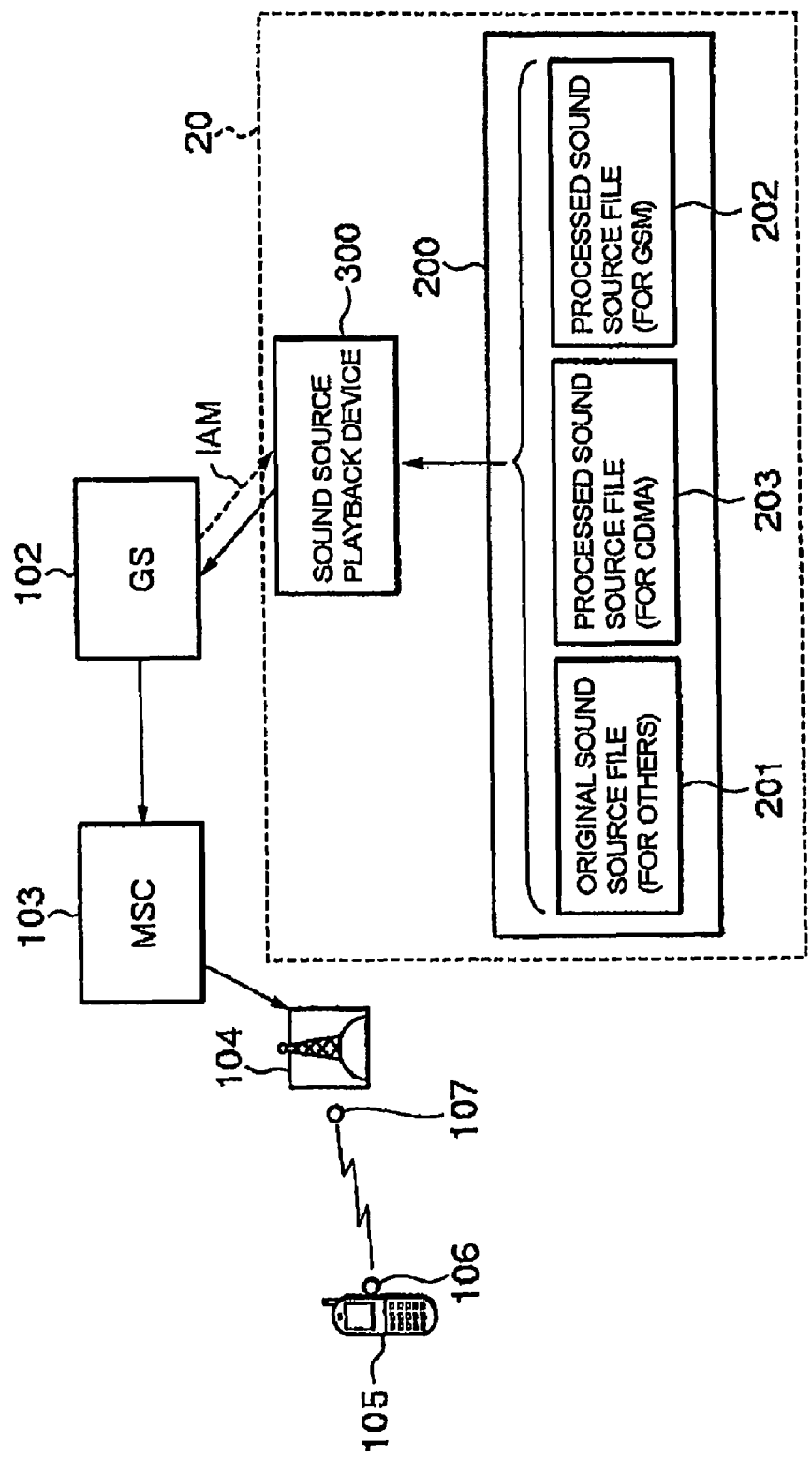
FIG. 2 is a diagram explanatory of a system having a sound source supply apparatus according to an embodiment of the present invention.

Referring to FIG. 2, there is illustrated a system having a sound source supply apparatus 20 for performing a sound source supply method according to an embodiment of the present invention. The system shown in FIG. 2 includes the same parts as denoted by the same reference numerals as in the system shown in FIG. 1 except the sound source supply apparatus 20.

The sound source supply apparatus 20 according to the embodiment of the present invention has a sound source file storage device 200 for storing an original sound source file 201 in a 128-kbit/sec WAV format, a processed sound source file (for GSM) 202 produced by processing the original sound source file 201, and a processed sound source file (for cdma) 203 produced by processing the original sound source file, and a sound source playback device (dial melody device) 300.

The processed sound source files 202 and 203 corresponding to the respective codec types are produced by processing the original sound source file (basic sound source file) with an algorithm produced according to the present invention. The produced processed sound source files are stored in the sound source file storage device 200 as a sound source database. This processing method is the core of the present invention.

FIG. 2 shows a case of listening to music in the dial melody service. Specifically, when the sound source playback device (dial melody device) 300 receives a start signal IAM (Initial Address Message) indicative of a playback request of music, it determines a codec type used by a caller based on caller information in the start signal, selects and connects a sound source file processed for the corresponding codec (one of the processed sound source files 202 and 203). At that time, the processed sound source file is sent as a μ-Law PCM (Pulse Code Modulation) signal or an A-Law PCM signal of 64 kbit/sec by the sound source playback device 300.

Next, there will be described operation of connection with improvement of the sound quality in the sound source supply apparatus 20 shown in FIG. 2.

In FIG. 2, when a playback request of music is provided by the start signal IAM, the sound source supply apparatus 20 determines a codec type of a calling terminal 105 based on caller information included in the start signal IAM and plays music of a sound source processed for the corresponding codec (one of the processed sound source files 202 and 203). If no sound sources have been prepared for the corresponding codec, then the sound source supply apparatus 20 plays music of the original sound source (the original sound source file 201).

The processed sound source files 202 and 203 for a playback are produced based on the original sound source of the original sound source file 201. At that time, it is necessary to cope with codecs of cellular phones. A summary of a processing algorithm for an audio codec 106 of the cellular phone 105 (GSM Terminal) is as follows.

Figure 3:
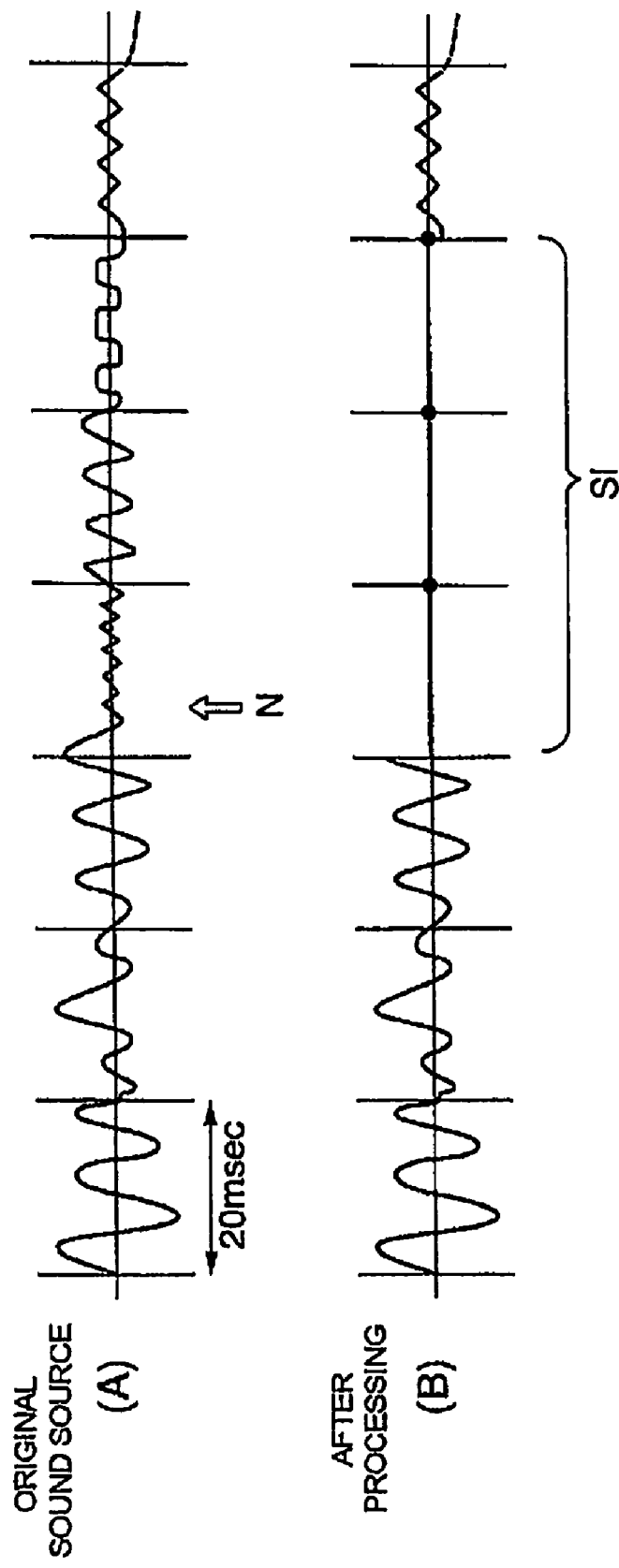
FIG. 3 is a diagram explanatory of an original sound source file and a processed sound source file (for GSM) used in the system shown in FIG. 2.

First, the processed sound source file (for GSM) 202 for a playback (see (B) in FIG. 3), which is produced based on the original sound source (see (A) in FIG. 3) of the original sound source file 201, will be described with reference to FIG. 3. With regard to the original sound source in (A) of FIG. 3, a frame determined to be a noise N and two frames right after the noise frame (three frames in total) out of 20-msec audio frames are forcibly replaced with zero as shown by "SI" in (B) of FIG. 3 (silencing, clipping).

The processing algorithm for performing the above process will be described with reference to FIG. 4.

Figure 4:
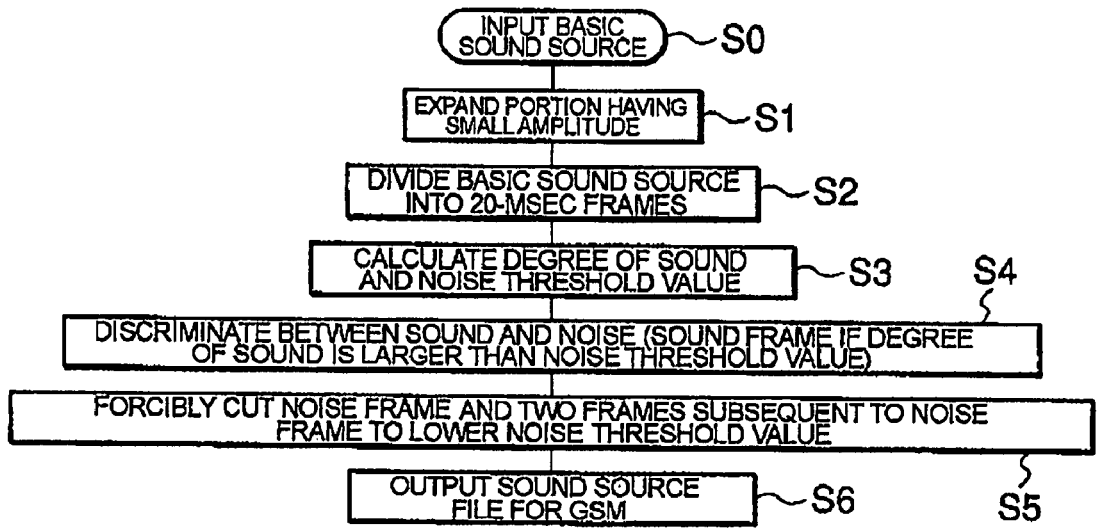
FIG. 4 is a flow chart showing a summary of a processing algorithm of the sound source file for GSM used in the system shown in FIG. 2.

1) A base sound source representing music is inputted (Step S0 in FIG. 4). Sound is intensively degraded in a portion of music having small volume (a portion having small amplitude). Accordingly, expansion (gain control) is performed on the portion having small amplitude (Step S1 in FIG. 4).

The reasons why sound is intensively degraded when music has small volume are as follows.

Figure 5:
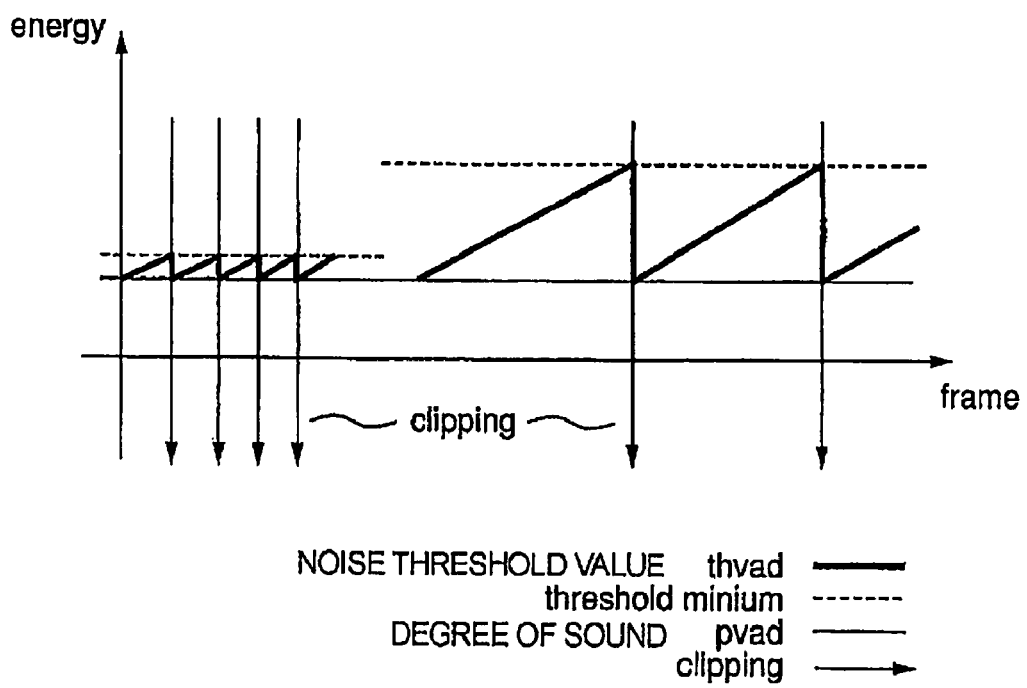
FIG. 5 is a diagram explanatory of a portion of the processing algorithm of the sound source file for GSM shown in FIG. 4.

The gain control algorithm has a purpose of amplifying the energy of signals to decrease the number of times of clipping conducted in a clipping process described in the following item 4). FIG. 5 shows a comparison of the numbers of times of forcible cuttings by the gain control. Referring to FIG. 5, if an absolute value of a degree of sound (pvad) is close to a noise threshold value (thvad), then a noise judgment index takes extremely short time to start from a minimum value, gradually increase, and finally reach a value that is regarded as a noise. According to a speaker recognition (VAD) algorithm, a signal is determined to be a noise when a noise threshold value (thvad) becomes larger than a degree of sound (pvad). If an absolute value of a degree of sound (pvad) is small as shown in (1) of FIG. 5, then the noise threshold value (thvad) reaches the degree of sound (pvad) in a moment. Therefore, it is necessary to perform forcible cuttings of noise frames frequently. If an absolute value of the degree of sound (pvad) is large as shown in (2) of FIG. 5, then the noise threshold value (thvad) takes longer time to reach a value that is regarded as a noise after a forcible cutting has been performed. Accordingly, the number of times of forcible cuttings is reduced.

2) The inputted basic sound source is divided into frames (160 samples) of 20 msec, which is an encode unit of the codec (106 in FIG. 2) (Step S2 in FIG. 4).

3) Discrimination between noise and voice (VAD: Voice Activity Detection) in the codec 106 is performed as follows. A coefficient of a degree of sound (pvad) and a noise threshold value (thvad) are calculated for each frame (Step S3 in FIG. 4). If the coefficient of the degree of sound (pvad) is larger than the threshold value (thvad), then that frame is determined to be a sound frame (Step S4 in FIG. 4).

4) The sound quality of music can be improved by changing a logic of the noise judgment. However, background noises cannot be removed. Thus, the sound quality of normal conversation is degraded. The specifications of the codec 106 cannot be changed for a mere purpose of music transmission. Therefore, according to the present invention, degradation of sound is prevented by processing the sound source file.

A frame in which a degree of sound is smaller than a noise threshold value is determined to be a noise frame. Accordingly, a degree of sound (pvad) should be larger than a noise threshold value (thvad) in order to prevent a current frame from being recognized as a noise frame. In order that a degree of sound is continuously larger than a noise threshold value, the following operation is performed. A portion in which a noise threshold value is larger than a degree of sound is searched by a GSM simulator. The noise threshold value is forcibly minimized in the searched portion so that the degree of sound is larger than the noise threshold value. At that time, in order to minimize the noise threshold value, the energy of the input signal should be forced to be zero in the corresponding input frame when the noise threshold value is updated in VAD. This can be achieved by forcing the signal to be zero. This process is referred to as a clipping process.

5) For a frame determined to be a noise when the sound source has not been processed, a total of three frames including that frame (noise frame) and two frames right after the noise frame are forcibly replaced with zero (silenced). The threshold value for noise judgment can be lowered by replacing the three successive frames with zero (Step S5 in FIG. 4). The sound source file in which the three successive frames have been replaced with zero is outputted as a processed sound source file for GSM (202 in FIG. 2) to the sound source file storage device (200 in FIG. 2) (Step S6 in FIG. 4).

Here, there will be described the reasons why the threshold value for judgment can be lowered by forcibly replacing (silencing) the corresponding frame (noise frame) and the two frames right after the noise frame with zero.

According to an algorithm inside of the codec (106 in FIG. 2) used in GSM, a noise threshold value largely depends upon the energy of the frame. Therefore, the noise threshold value can be lowered by setting the input signal to be zero (energy=0).

There will be described the number of frames effective in lowering the threshold value by replacing (silencing) the signal with zero.

According to an algorithm used for calculating a noise threshold value in GSM, a noise threshold value is not lowered to a minimum value with one silent frame or with two silent frames. A noise threshold value can be lowered to a minimum value by silencing three or more successive frames. When four or more frames are silenced, a snapping sound of instantaneous interruption can be heard at the time of a playback. The quality of sound can be improved in either case of two silent frames and four silent frames. The quality of sound can be improved to the highest degree in the case of three silent frames. When the number of frames successively silenced is represented by N (=a positive integer), the quality of sound can be improved even in a case where N is a positive integer other than three. However, when N is three, the best improvement effects can be obtained.

6) By lowering the noise threshold value (thvad), the input signal is regarded as a sound. Accordingly, degradation of sound can be reduced.

Figure 6:
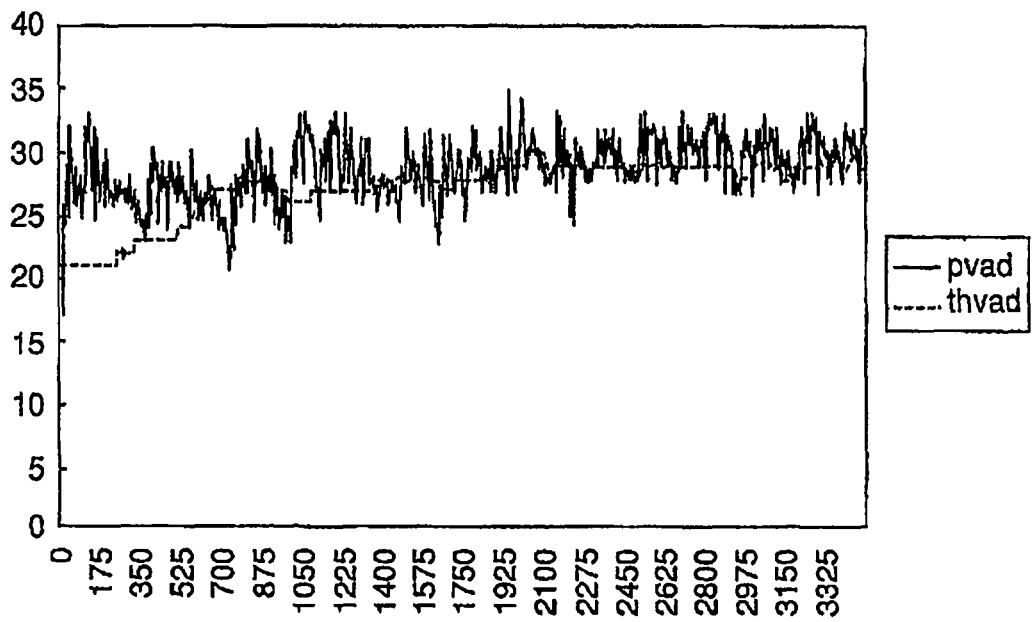
FIG. 6 is a graph showing variations of a degree of sound (pvad) and a noise threshold value (thvad) of a sound source file used in the system shown in FIG. 1.
Figure 7:
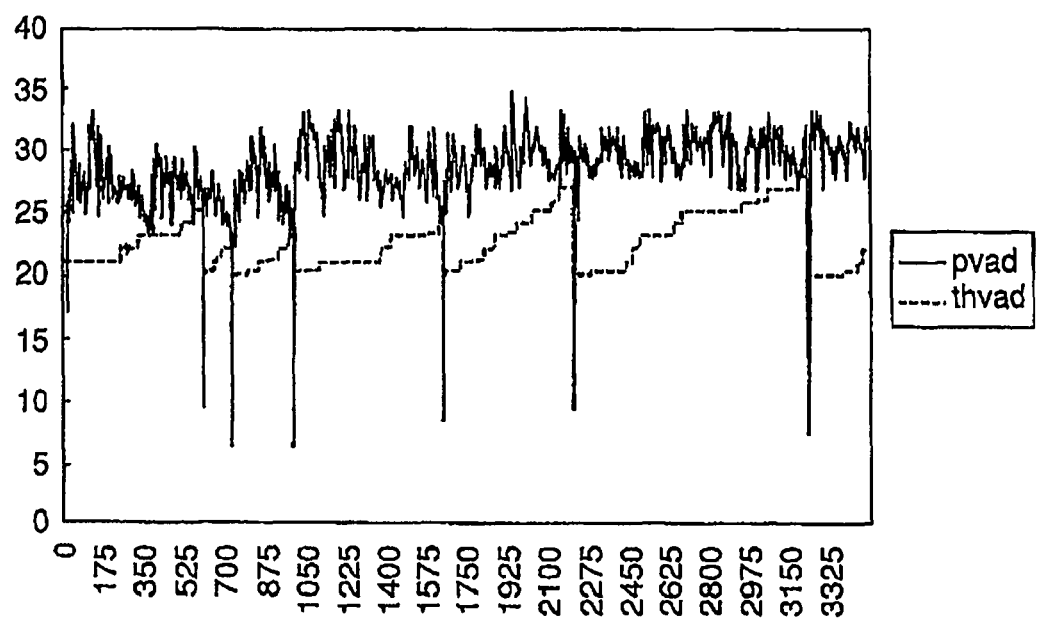
FIG. 7 is a graph showing variations of a degree of sound (pvad) and a noise threshold value (thvad) of the sound source file used in the system shown in FIG. 2.

FIGS. 6 and 7 show variations of a degree of sound (pvad) and a noise threshold value (thvad) of the sound source file without the improvement (the sound source file 100 in FIG. 1) and the sound source file with the improvement (the sound source file 202 in FIG. 2). In FIG. 6 (without the improvement), since the noise threshold value (thvad) was large, many frames were determined to be a noise. In FIG. 7 (with the improvement), since the noise threshold value was lowered by forcible cuttings of input signals, the number of frames determined to be a noise is remarkably reduced.

7) Even if the noise threshold value has been lowered, it is gradually increased by subsequent inputs. By performing expansion (gain control) on a portion having small amplitude as described in Item 1), a period of time in which the noise threshold value reaches a value that is regarded as a noise can be lengthened. As a result, the number of frames forcibly cut can be reduced.

Thus, according to the present invention, the sound source file 202 processed so as to correspond to the codec 106 is selected and connected. Accordingly, it is possible to listen to music with less degradation of sound.

Next, evaluation results of improvement in the sound quality will be described.

1) Evaluation with a Simulator

Twenty kinds of sound sources were prepared for evaluation of the improvement in sound quality. The evaluation results are listed below in Table 2.

TABLE 2

Evaluation results with GSM simulator

| Music No. | Total number of frames | Number of noise frames without improvement | Number of noise frames with improvement | Performance improvement (Number of reduction) |
|---|---|---|---|---|
| 1 | 2000 | 211 | 0 | 211 |
| 2 | 2043 | 373 | 0 | 373 |
| 3 | 1980 | 192 | 21 | 171 |
| 4 | 2022 | 35 | 3 | 32 |
| 5 | 2016 | 14 | 0 | 14 |
| 6 | 1998 | 20 | 7 | 13 |
| 7 | 2004 | 971 | 20 | 951 |
| 8 | 2002 | 105 | 21 | 84 |
| 9 | 2005 | 663 | 9 | 654 |
| 10 | 2004 | 354 | 22 | 332 |
| 11 | 2003 | 171 | 0 | 171 |
| 12 | 2003 | 1168 | 15 | 1153 |
| 13 | 2005 | 172 | 10 | 162 |
| 14 | 2022 | 0 | 0 | 0 |
| 15 | 1959 | 886 | 8 | 878 |
| 16 | 2004 | 116 | 5 | 111 |
| 17 | 1980 | 1050 | 22 | 1028 |
| 18 | 2011 | 58 | 7 | 51 |
| 19 | 2004 | 896 | 15 | 881 |
| 20 | 2004 | 94 | 5 | 89 |

The number of noise frames listed above was measured for sound sources without the improvement and sound sources with the improvement by using a GSM simulator.

The number of noise frames and a ratio of reduction of noise frames due to the improvement in sound quality according to the present invention varied depending upon music. The number of noise frames without the improvement was small for music mainly constituted by song or music constituted solely by violin sound. Particularly, no frames in the music No. 14 had been determined to be a noise frame since the beginning of the music, so that the music without the improvement was the same as the music with the improvement. The number of noise frames was increased for piano songs, orchestra songs, and dynamic music having rapid variations. The improvement in sound quality according to the present invention was highly effective in those songs.

2) Subjective Evaluation with an Actual Terminal (MOS)

Pieces of music before and after processing a sound source were played via an actual cellular phone network by a GSM terminal, compared with each other, and evaluated. In the case of the sound source without the improvement, a grunting noise was mixed when one phrase ended in the music. However, noises were hardly mixed in the case of the improved sound source. Thus, it was evaluated that the quality of sound could be improved.

The degree of improvement in sound quality according to the present invention differs depending upon music. Singing music and string music had less audible noises even without the improvement. The number of audible noises was remarkably reduced in piano music and music having large variations.

INDUSTRIAL APPLICABILITY

The present invention can widely be used in general services for listening to music via a cellular phone.

Particularly, in a dial melody service, both of end-users and sound source providers have demanded improvement of the sound quality. End-users have had the following request for improvement of the sound quality: "We want to listen to music having high quality." The content providers have had the following demands: "We want to supply music to be played with high quality. As a result, we want to increase sales of providing contents. If the quality of sound is low, then we cannot increase sales of the providing contents." The present invention can meet these requests and demands.

The invention claimed is:

1. A sound source supply apparatus for providing a service for playing music via a portable terminal, the sound source supply apparatus comprising:

a sound source file storage device for preliminarily storing a plurality of types of processed sound source files produced by processing an original sound source of the music so as to reduce degradation of sound according to a plurality of types of codec characteristics; and a sound source playback device for determining a codec type of the portable terminal from a start signal indicative of a playback request when the sound source playback device receives the start signal, playing back one processed sound source file corresponding to the determined codec type selectively from the plurality of types of processed sound source files, and supplying the one processed sound source file to the portable terminal so as to play the music via the portable terminal, wherein any of the plurality of types of processed sound source files is produced by processing the original sound source so as to silence three successive frames beginning from a frame that is regarded as a noise if the original sound source is not processed, out of audio frames in the original sound source.

2. The sound source supply apparatus as recited in claim 1, wherein:

the sound source playback device determines the codec type of the portable terminal based on caller information included in the start signal when it receives the start signal indicative of a playback request.

3. A sound source supply method of providing a service for playing music via a portable terminal, the sound source supply method comprising:

a step of preliminarily storing a plurality of types of processed sound source files produced by processing an original sound source of the music so as to reduce degradation of sound according to a plurality of types of codec characteristics;

a type determination step of determining a codec type of the portable terminal from a start signal indicative of a playback request on receipt of the start signal; and a step of playing back one processed sound source file corresponding to the determined codec type selectively from the plurality of types of processed sound source files and supplying the one processed sound source file to the portable terminal so as to play the music via the portable terminal, wherein any of the plurality of types of processed sound source files is produced by processing the original sound source so as to silence three successive frames beginning from a frame that is regarded as a noise if the original sound source is not processed, out of audio frames in the original sound source.

4. The sound source supply method as recited in claim 3, wherein:

the type determination step comprises determining the codec type of the portable terminal based on caller information included in the start signal on receipt of the start signal indicative of a playback request.

5. A sound source supply apparatus for providing a service for playing music via a portable terminal, said sound source supply apparatus comprising:

a sound source file storage device for preliminarily storing a processed sound source file produced by processing an original sound source of the music so as to reduce degradation of sound according to codec characteristics of the portable terminal; and a sound source playback device for playing back the processed sound source file when the sound source playback device receives a start signal indicative of a playback request and supplying the processed sound source file to the portable terminal so as to play the music via the portable terminal, wherein the processed sound source file is produced by processing the original sound source so as to silence three successive frames beginning from a frame that is regarded as a noise if the original sound source is not processed, out of audio frames in the original sound source.

6. A sound source supply method of providing a service for playing music via a portable terminal, the sound source supply method comprising:

a step of preliminarily storing a processed sound source file produced by processing an original sound source of the music so as to reduce degradation of sound according to codec characteristics of the portable terminal; and a step of playing back the processed sound source file on receipt of a start signal indicative of a playback request and supplying the processed sound source file to the portable terminal so as to play the music via the portable terminal, wherein the processed sound source file is produced by processing the original sound source so as to silence three successive frames beginning from a frame that is regarded as a noise if the original sound source is not processed, out of audio frames in the original sound source.

* * * * *